United States Patent
Yin

(10) Patent No.: US 7,852,848 B2
(45) Date of Patent: Dec. 14, 2010

(54) SERVICE GATEWAY, SERVING SYSTEM, QOS NEGOTIATION METHOD AND SERVING RECOURSE RELEASE METHOD

(75) Inventor: Xin Yin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/199,561

(22) Filed: Aug. 27, 2008

(65) Prior Publication Data

US 2008/0317054 A1    Dec. 25, 2008

Related U.S. Application Data

(63) Continuation of application No. PCT/CN2006/002796, filed on Oct. 20, 2006.

(30) Foreign Application Priority Data

Feb. 28, 2006    (CN) ................ 2006 1 0033958

(51) Int. Cl.
  *H04L 12/56* (2006.01)
(52) U.S. Cl. ................... 370/395.2; 370/401
(58) Field of Classification Search .............. None
  See application file for complete search history.

(56) References Cited

U.S. PATENT DOCUMENTS

2004/0223602 A1* 11/2004 Honkasalo et al. ........ 379/243
2005/0122945 A1* 6/2005 Hurtta ..................... 370/338
2006/0002333 A1* 1/2006 Skog et al. ................ 370/328
2006/0182119 A1 8/2006 Li et al.

FOREIGN PATENT DOCUMENTS

| CN | 1615626 A | 7/2004 |
| CN | 1518278 A | 8/2004 |
| CN | 1617511 A | 5/2005 |
| CN | 1625152 A | 6/2005 |
| CN | 100531128 C | 8/2009 |
| WO | WO 2004015520 A1 | 2/2004 |

* cited by examiner

Primary Examiner—Chirag G Shah
Assistant Examiner—Daniel Mitchell
(74) Attorney, Agent, or Firm—Leydig, Voit & Mayer, Ltd.

(57) ABSTRACT

Embodiments of the present invention provide a service gateway, comprising a service session detection unit adapted to detect a service session request and the end of a service session. The service gateway further comprises a QoS negotiation unit, adapted to acquire quality of service (QoS) information of a service session after the service session request is detected by the service session detection unit, request corresponding service serving network resource according to the QoS information, and trigger to release the service serving network resource when the end of the service session is detected by the service session detection unit. In addition, the embodiments of the present invention also disclose a corresponding service serving system, QoS negotiation and service serving network resource release method. The present invention could implement a QoS request process without the participation of a terminal. Embodiments of the present invention are conveniently to be deployed and implemented, and the peer-to-peer QoS can be quickly deployed and implemented without changing the current network service server.

13 Claims, 4 Drawing Sheets

US 7,852,848 B2

SERVICE GATEWAY, SERVING SYSTEM, QOS NEGOTIATION METHOD AND SERVING RECOURSE RELEASE METHOD

CROSS-REFERENCE TO RELATED APPLICATION

This application is a continuation of International Patent Application No. PCT/CN2006/002796, filed Oct. 20, 2006, which claims priority to Chinese Patent Application No. 200610033958.6, filed Feb. 28, 2006, each of which is hereby incorporated by reference in its entirety.

FIELD OF THE INVENTION

The present invention relates to a Quality of Service (QoS) technology in the mobile communication network, and more particularly, to a service gateway, a service serving system, a QoS negotiation method, and a service serving network resource release method in the mobile communication network.

BACKGROUND

With the wide employment of IP bearer technologies in the mobile communication network and in the mobile communication field, people become more and more concerned about how to ensure QoS in the packet domain of a mobile network and how to provide satisfactory services for the mobile network to users, according to different service features.

A dynamic QoS (DQoS), i.e., a session-based DQoS control mechanism, becomes a direction to research in order to implement a peer-to-peer QoS service in the packet domain of the mobile communication network. The session-based DQoS control mechanism can provide strict QoS guarantee and good extensibility by performing access control for each session, resource reservation, and policy distribution dynamically in a control plane and performing service awareness and policy enforcement in a data plane.

FIG. 1 shows a QoS request process based on the above DQoS control mechanism. In FIG. 1, a terminal 1 and a service server 2 function as bearer entities for a peer-to-peer QoS service in which the terminal 1 initiates a service request, the service server 2 performs the service request initiated by the terminal 1 and implements service interaction with the terminal 1, and a policy decision functional entity (PDF) 3 generates a QoS authorization policy. In particular, a QoS negotiation process is as follows.

In block s1, a service request is received by an application layer of the terminal 1.

In block s2, after the service request is received, an application request is sent to the service server 2 by the application layer of the terminal 1.

In block s3, a service QoS request is sent to the PDF 3 via a Gq interface by an application layer of the service server 2, wherein the detailed content of the service QoS request is applying for a QoS authorization token.

In block s4, after the service QoS request is received, an authorization token is returned to the application layer of the service server 2 by the PDF 3.

In block s5, the authorization token is returned to the application layer of the terminal 1 by the application layer of the service server 2.

In block s6, the authorization token of the service QoS is delivered by the application layer of the terminal 1.

In block s7, a resource application request is sent to a gateway GPRS support node (GGSN) 40 in a WCDMA network 4 via a Gn interface by the terminal 1, according to the authorization token.

In block s8, a resource application map carrying the authorization token is sent to the PDF 3 via a Go interface by the GGSN 40.

In blocks s9, s10, s11, and s12, it is decided by the PDF 3 whether the terminal 1 can perform the current QoS application, and if the terminal 1 is allowed to acquire the service, resource requests (including local resource application of the GGSN) are sent by the GGSN to other elements in the WCDMA network 4, such as a serving GPRS support node (SGSN) 41, an access network 42, etc. The QoS request is completed.

The prior art described above has disadvantages as follows.

Firstly, in existing QoS negotiation methods, it requires a terminal to participate in a QoS request, and requires the terminal and its applications to support session initiation protocol (SIP) signaling in the R6 standard. There is no such terminal which could support the R6 standard currently; thus, it is difficult to implement the QoS negotiation method.

Secondly, the prior art requires each service server to function as a service awareness point, which is difficult to be deploy and implement because types and number of the service servers in current 3G network are numerous Finally, in existing systems it is impossible to deploy and implement the peer-to-peer QoS without changing the current network service server.

SUMMARY

Embodiments of the present invention are to provide a service gateway, a service serving system, a QoS negotiation, and a serving resource release method. The present invention could implement a QoS request process without the participation of a terminal.

The present invention can be deployed and implemented easily, and the peer-to-peer QoS can be quickly deployed and implemented without changing the current network service server.

Embodiments of the present invention provide a service gateway, including: a service session detection unit, adapted to detect a service session request and the end of the service session; and a quality of service (QoS) negotiation unit, adapted to acquire QoS information of the service session after the service session request is detected by the service session detection unit, request corresponding service serving resource according to the QoS information, and trigger to release the service serving resource when the end of the service session is detected by the service session detection unit.

The following technical solution of the service gateway is an optional technical solution.

The QoS negotiation unit further includes: a service QoS information acquirement unit, adapted to request and acquire the QoS information from an integrated service data platform after the service session request is detected by the service session detection unit; a resource application operation unit, adapted to request the service serving resource corresponding to the QoS from a policy decision functional entity after the service QoS information is acquired; and a resource release operation unit, adapted to request the policy decision functional entity to release the service serving resource corresponding to the service QoS after the end of the service session is detected by the service session detection unit.

Embodiments of the present invention further provide a service serving system, including: a service server, adapted to receive and perform a service request initiated by a terminal, and interact with the terminal; an integrated service data platform, adapted to save service QoS information; a packet-domain mobile communication network, communicated with the terminal and adapted to provide a bearer channel for service access for the terminal; a policy decision functional entity, communicated with the packet-domain mobile communication network, and adapted to generate a QoS authorization policy; and a service gateway, communicated with the service server, the policy decision functional entity, the integrated service data platform and the mobile communication network, respectively. The service gate way includes: a service session detection unit, adapted to detect a service session request and the end of a service session; and a QoS negotiation unit, adapted to acquire the QoS information of the service session from the integrated service data platform after the service session request is detected by the service session detection unit, request service serving resource for the service from the policy decision functional entity according to the QoS information, and trigger to release the service serving resource after the end of the service session is detected by the service session detection unit.

The following technical solution of the service serving system is an optional technical solution.

The QoS negotiation unit further includes: a service QoS information acquirement unit, adapted to request and acquire the QoS information from the integrated service data platform after the service session request is detected by the service session detection unit; a resource application operation unit, adapted to request the service serving resource corresponding to the QoS from the policy decision functional entity after the service QoS information is acquired; and a resource release operation unit, adapted to request the policy decision functional entity to release the service serving resource corresponding to the service QoS after the end of the service session is detected by the service session detection unit.

Embodiments of the present invention further provide a method for implementing quality of service (QoS) negotiation in a service serving system, wherein the service serving system includes an integrated service data platform, a policy decision functional entity, and a packet-domain mobile communication network, wherein the method includes the blocks of: acquiring service QoS information from the integrated service data platform after a service request from a terminal is detected; triggering a resource application process according to the QoS information, and completing a service serving resource application by the interaction between the policy decision functional entity and the packet-domain mobile communication network.

The following technical solution of the method for implementing QoS negotiation in the service serving system is an optional technical solution.

The block of acquiring the QoS information includes: requesting the service QoS information from the integrated service data platform after the service session request is detected; and acquiring the service QoS information according to the information returned by the integrated service data platform.

The block of completing the service serving resource application includes: sending a resource application authorization request to the policy decision functional entity according to the service QoS information; delivering policy information to the packet-domain mobile communication network from the policy decision functional entity according to the acquired resource application authorization request; assigning corresponding network resource to the current service application request according to the policy information, deploying the policy, and sending back a policy deployment report to the policy decision functional entity by the packet-domain mobile communication network; and sending back resource application authorization response information from the policy decision functional entity after the policy deployment report is received.

Embodiments of the present invention further provide a method for releasing service serving resource in a service serving system, wherein the service serving system includes a policy decision functional entity and a packet-domain mobile communication network, and wherein the method includes: collecting the current service session resource assignment information, and generating a service resource release authorization request, after the end of a service session is detected; and sending the service resource release authorization request to the policy decision functional entity, and completing resource release by the interaction between the policy decision functional entity and the packet-domain mobile communication network.

Alternatively, the block of completing resource release includes: sending the service resource release authorization request to the policy decision functional entity; delivering a policy deployment request to the packet-domain mobile communication network from the policy decision functional entity according to the acquired service resource release authorization request; releasing corresponding service serving resource and cancelling corresponding policy by the packet-domain mobile communication network according to the policy deployment request; sending back a policy deployment report from the packet-domain mobile communication network after the policy cancellation and resource release are completed; and sending back a resource release authorization response information from the policy decision functional entity after the policy deployment report is received.

The present invention has several advantages over the prior art as follows.

With a service gateway, the present invention collects service traffic, detects a service session request and the end of a service session, and acquires service QoS information required by the service session from an integrated service data platform, applies for service serving network resource corresponding to the QoS from a policy decision functional entity according to the service QoS information, and releases the service serving network resource after the service session ends. Because the service session detection is deployed on the same service gateway, it is not necessary for a terminal to participate in a QoS request. Moreover, because the peer-to-peer QoS can be quickly deployed and implemented without changing the current network service server, the difficulty of upgrading the current network is greatly decreased and the present invention can be easily implemented in the current network environments.

DETAILED DESCRIPTION

The primary technical content of the embodiments of the present invention includes: awareness points for various services are deployed on a service gateway, i.e., the service gateway collects service traffic flow and detects a service session request and the end of a service session. During a service QoS negotiation, the service gateway acquires service QoS information required by the service session from an integrated service data platform and applies for service serving network resource corresponding to the service QoS from a policy decision functional entity according to the service QoS information. After the service session ends, the service gateway initiates a process of releasing the service serving network resource. It is unnecessary for each service server to function as a service awareness point, which greatly decreases the difficulty of deploying a peer-to-peer QoS scheme, and the peer-to-peer QoS scheme can be quickly deployed and implemented without changing the current network service server.

Figure 1:
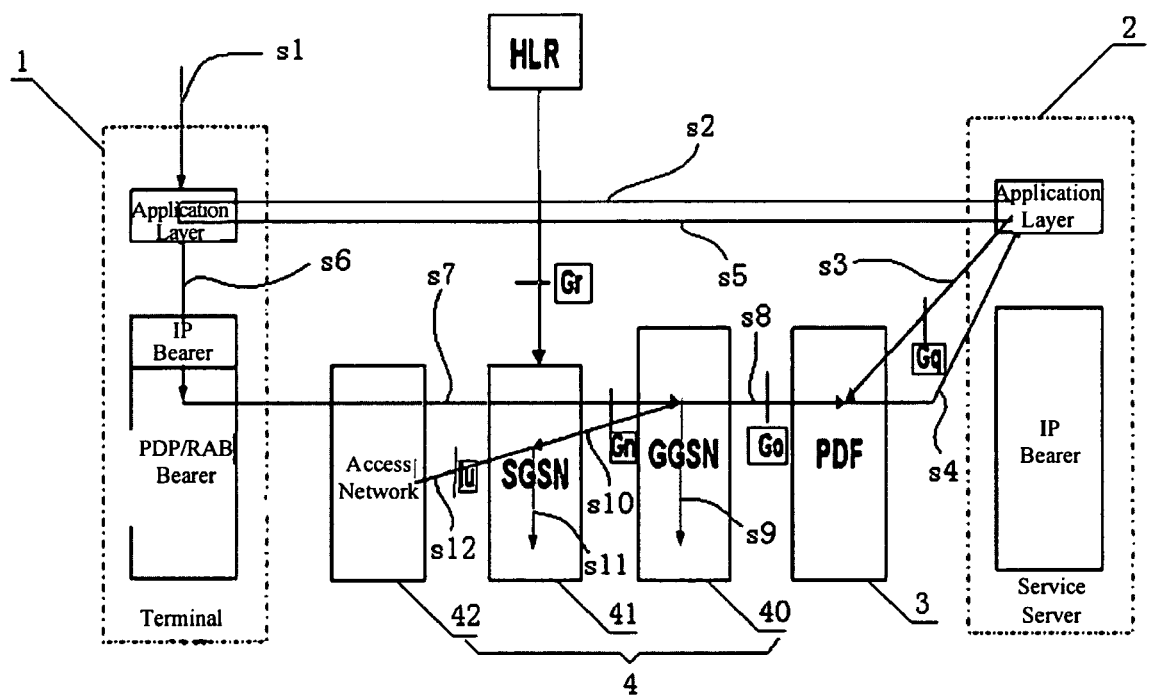
FIG. 1 is a schematic diagram of QoS negotiation.
Figure 2:
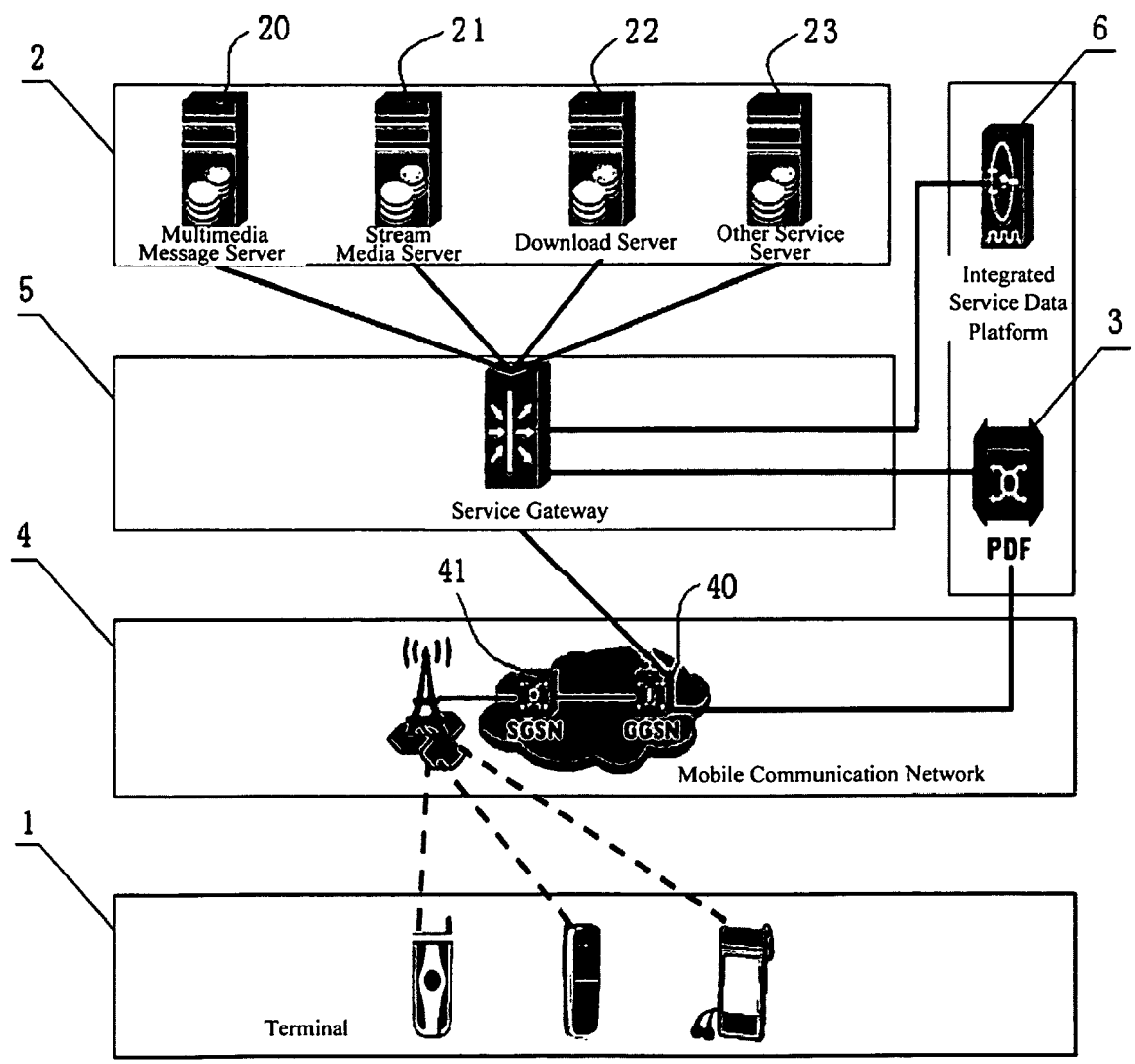
FIG. 2 is a schematic diagram of a service serving system according to an embodiment of the present invention.

FIG. 2 is a schematic diagram of a service serving system provided by an embodiment of the present invention. In FIG. 2, the terminal 1 is a serving object in the system and functions as the initiator of a QoS service request. The terminal 1 may be any terminal equipment based on the mobile communication network, such as cell phone, PDA, and so on.

The service serving system according to an embodiment of the present invention includes a service server 2, which is used to perform a service request initiated by the terminal 1 and to interact with the terminal 1. The service server 2 may include various service servers, such as a multimedia message server 20 for providing multimedia message service, a stream media server 21 for providing stream media service, a download server 22 for providing information download service, and so on. The service server 2 may further include other service servers 23 for providing other services. It should be noted that the other service servers 23 are class concept indicating service servers other than the aforementioned three types of service servers, which is not enumerated for the types of service servers are numerous. However, no matter what type of service servers are applied in the system, the implementation of the system performance would not be influenced.

In addition, the service serving system according to an embodiment of the present invention may also include an integrated service data platform 6, which is used to save service QoS information which can be used to determine the integrated serving level of the service.

In addition, the service serving system according to an embodiment of the present invention may also include a PDF 3, which is mainly used to generate and deliver a QoS authorization policy.

In addition, the service serving system according to an embodiment of the present invention may also include a mobile communication network 4, which is mainly used to provide a bearer channel to access service for the terminal 1. The mobile communication network 4 may be a WCDMA network, or other form of network, which will not be described in detail here.

In addition, the service serving system according to an embodiment of the present invention may also include a service gateway 5, which is connected to the service server 2, the PDF 3 and the mobile communication network 4, respectively. The main function of the service gateway 5 is to collect service traffic flow, detect a service session request and the end of a service session, acquire service QoS information required by the service session from the integrated service data platform 6, apply for service serving network resource corresponding to the service QoS from the PDF 3 according to the service QoS information, and release the service serving network resource after the service session ends.

The service gateway 5 according to an embodiment of the present invention is connected to the mobile communication network 4, the service server 2, and the PDF 3. It is obvious that the service gateway 5 is in the core position of the system provided by an embodiment of the present invention. It is necessary for the service request initiated by the terminal 1 to pass through the service gateway 5. The service gateway 5 interacts with the PDF 3 and the service server 2, which are at the serving side, and communicates with the mobile communication network 4. Specifically, a GGSN 40 communicates with the service gateway 5 and the PDF 3 in the mobile communication network 4, the GGSN 40 communicates with a SGSN 41 in the mobile communication network 4, and the SGSN 41 communicates with other elements in the mobile communication network 4; and, thus, the mobile communication network 4 could communicate with the terminal 1, the PDF 3 at the serving side, and the service gateway 5.

Figure 3:
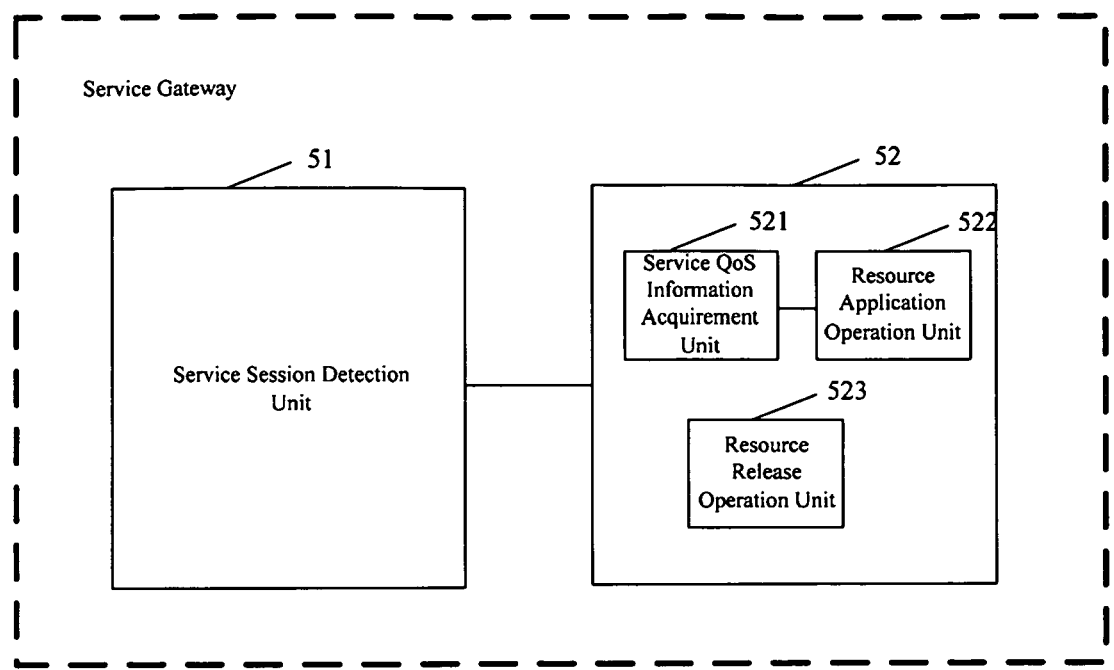
FIG. 3 is a schematic diagram of a service gateway in the service serving system according to an embodiment of the present invention.

Referring to FIG. 3, the service gateway according to an embodiment of the present invention is set forth in detail below. The service gateway 5 according to an embodiment of the present invention may include a service session detection unit 51 adapted to detect a service session request and the end of a service session; a QoS negotiation unit 52 adapted to acquire QoS information of the service session and request corresponding service serving network resource according to the QoS information after the service session request is detected; and trigger to release the service serving network resource when the service session is detected to end.

The QoS negotiation unit may further include: a service QoS information acquirement unit 521 adapted to apply for and acquire the QoS information from an integrated service data platform after the service session request is detected; a resource application operation unit 522 adapted to apply for the service serving network resource corresponding to the QoS information from a policy decision functional entity after the service QoS information is acquired; and a resource release operation unit 523 adapted to request the policy decision functional entity to release the service serving network resource corresponding to the service QoS information after the service session is detected to end.

Figure 4:
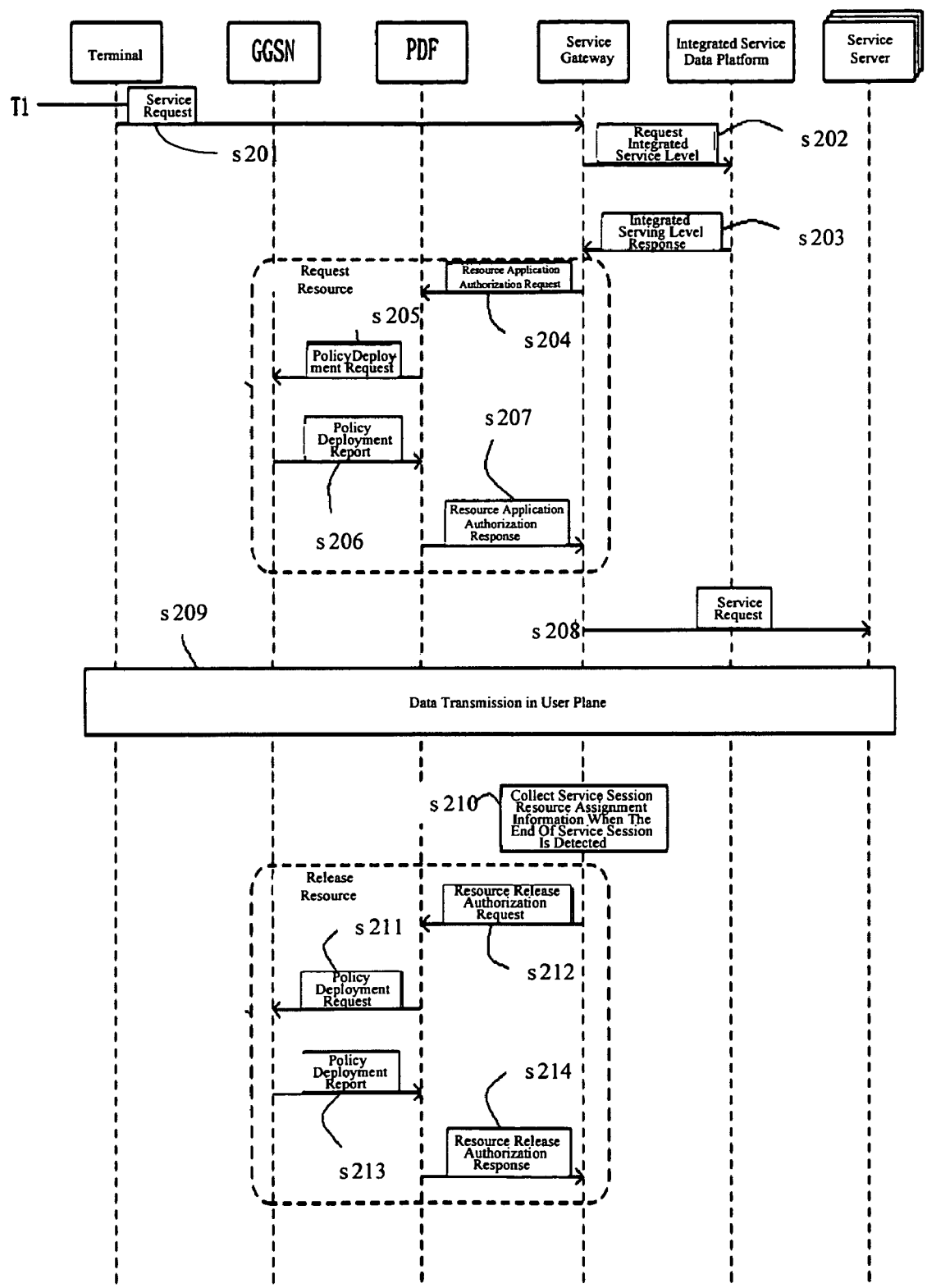
FIG. 4 is a flow chart of realizing a method for negotiating QoS and releasing service serving network resource according to an embodiment of the present invention.

A method for performing QoS negotiation and service serving network resource release based on the service gateway is set forth in detail below. As shown in FIG. 4, entities involved in the QoS negotiation and service serving network resource release method may include a terminal, a GGSN in a mobile communication network, a PDF, a service gateway, an integrated service data platform, and a service server. The detailed flow of the QoS negotiation is as follows.

Block s201: A service session request is acquired by the terminal. When the terminal sends the service session request to the service server through the mobile communication network, the service session request is intercepted by the service gateway.

Block s202: The intercepted service session request is parsed by the service gateway to acquire specific service identification information, and an integrated service level request is sent to the integrated service data platform according to the specific service identification information to acquire the service QoS information by the service gateway.

Block s203: The QoS information required by the service is determined by the mobile data platform according to user information and service information provided by the integrated serving level request, and the QoS information is transferred to the service gateway through a service integrated serving level response.

Block s204: The service gateway initiates a resource application authorization request to the PDF.

Block s205: Policy information is delivered to the GGSN (GPRS gateway support node) of the mobile communication network by the PDF according to the resource application authorization request and the condition of the mobile communication network. A necessary network resource is assigned to the service request according to the policy information and the policy is deployed by the GGSN.

Block s206: After the policy deployment and resource assignment are completed, a policy deployment report is sent to the PDF by the GGSN.

Block s207: After the policy deployment report is received, a resource application authorization response is sent by the PDF to the service gateway.

Block s208: The intercepted service session request is forwarded to the corresponding service server by the service gateway.

Block s209: Data exchange in a user plane is performed in a channel with peer-to-peer QoS guarantee by the service server and the terminal; thus, the service serving negotiation is completed.

In addition, a process of service serving network resource release can also be implemented by the service gateway according to an embodiment of the present invention. Referring to FIG. 4, the detailed flow of the service serving network resource release is as follows.

Block s210: When the service gateway detects the end of the service session, the resource assignment information of the service session is collected and a resource release authorization request is generated by the service gateway.

Block s211: The resource release authorization request is sent to the PDF by the service gateway.

Block s212: A policy deployment request is delivered to the GGSN in the mobile communication network by the PDF according to the resource release authorization request and the condition of the mobile communication network, and the corresponding resource is released and the corresponding policy is cancelled by the GGSN according to the policy deployment request.

Block s213: After the policy cancellation and resource release is completed, a policy deployment report is sent back to the PDF by the GGSN.

Block s214: After the policy deployment report is received, a resource release authorization response is sent by the PDF to the service gateway.

The above are only exemplary embodiments of the present invention, and are not intended to limit the protecting scope of the present invention. Any changes, equivalent replacements, and improvements made within the spirit and scope of the present invention should be included in the protecting scope of the present invention.

What is claimed is:

1. A service gateway in a service serving system comprising:
   a policy decision functional entity (PDF) and a gateway GPRS support node (GGSN) which is connected to the PDF and configured to interact with the PDF to assign and release service serving resource, wherein the service gateway further comprises:
   a service session detection unit, configured to detect a service session request and the end of the service session; and
   a quality of service (QoS) negotiation unit, configured to acquire QoS information of the service session after the service session request is detected by the service session detection unit, request corresponding service serving resource according to the QoS information, and trigger to release the service serving resource when the end of the service session is detected by the service session detection unit.

2. The service gateway according to claim 1, wherein the QoS negotiation unit further comprises:
   a service QoS information acquirement unit, configured to request and acquire the QoS information after the service session request is detected by the service session detection unit;
   a resource application operation unit, configured to request the service serving resource corresponding to the QoS after the service QoS information is acquired; and
   a resource release operation unit, configured to request to release the service serving resource corresponding to the service QoS after the end of the service session is detected by the service session detection unit.

3. A service serving system, comprising:
   a service server, configured to receive and perform a service request initiated by a terminal, and interact with the terminal;
   an integrated service data platform, configured to save service QoS information and to determine QoS information of the service;
   a packet-domain mobile communication network, communicated with the terminal and configured to provide a bearer channel for service access for the terminal and assign service serving resource;
   a policy decision functional entity (PDF), communicated with the packet-domain mobile communication network, and configured to generate a QoS authorization policy; and
   a service gateway, communicated with the service server, the policy decision functional entity, the integrated service data platform, and the packet-domain mobile communication network, respectively, and configured to detect a service session request and the end of a service session; and to acquire the QoS information of the service session from the integrated service data platform after the service session request is detected, request service serving resource for the service from the policy decision functional entity (PDF) according to the QoS information, and trigger to release the service serving resource after the end of the service session is detected;
   wherein the packet-domain mobile communication network comprises a gateway GPRS support node (GGSN) which is connected to the PDF and configured to interact with the PDF so as to assign and release the service serving resource.

4. The service serving system according to claim 3, wherein the service gateway further comprises:
   a service session detection unit, configured to detect a service session request and the end of the service session; and
   a QoS negotiation unit, configured to acquire the QoS information of the service session from the integrated service data platform after the service session request is detected, request corresponding service serving resource from the policy decision functional entity according to the QoS information, and trigger to release the service serving resource after the end of the service session is detected.

5. The service serving system according to claim 4, wherein the QoS negotiation unit further comprises:
- a service QoS information acquirement unit, configured to request and acquire the QoS information from the integrated service data platform after the service session request is detected;
- a resource application operation unit, configured to request the service serving resource corresponding to the QoS from the policy decision functional entity after the service QoS information is acquired; and
- a resource release operation unit, configured to request the policy decision functional entity to release the service serving resource corresponding to the service QoS after the end of the service session is detected.

6. A method for implementing quality of service (QoS) negotiation in a service serving system, wherein the method comprises:
- detecting, by a service gateway in the service serving system that comprises a policy decision functional entity (PDF) and a gateway GPRS support node (GGSN) which is connected to the PDF and configured to interact with the PDF to assign and release service serving resource, a service session request from a terminal;
- parsing, by the service gateway, the service session request and acquiring QoS information corresponding to the service session request;
- triggering, by the service gateway, a resource application authorization request according to the QoS information;
- receiving, by the service gateway, a resource application authorization response; and
- sending, by the service gateway, the service session request to a corresponding service server according to the resource application authorization response.

7. The method for implementing QoS negotiation according to claim 6, wherein the parsing the service session request and acquiring QoS information corresponding to the service session request further comprises:
- parsing, by the service gateway, the service session request and acquiring service identification information; and
- requesting, by the service gateway, integrated service level request corresponding to the service identification information from the integrated service data platform, so that the integrated service data platform determines the service QoS information according to the integrated service level request.

8. The method for implementing QoS negotiation according to claim 6, wherein the triggering a resource application authorization request according to the QoS information further comprises:
- sending, by the service gateway, a resource application authorization request to a policy decision functional entity according to the service QoS information;
- delivering policy information to a packet-domain mobile communication network from the policy decision functional entity according to the resource application authorization request;
- assigning corresponding service serving resource according to the policy information, deploying the policy information, and sending back a policy deployment report to the policy decision functional entity by the packet-domain mobile communication network; and
- sending back a resource application authorization response by the policy decision functional entity.

9. The method for implementing QoS negotiation according to claim 8, comprising:
- delivering policy information to the GGSN in a the packet-domain mobile communication network; and
- assigning corresponding service serving resource according to the policy information, deploying the policy, and sending back a policy deployment report to the policy decision functional entity by the packet-domain mobile communication network, which further comprises:
- assigning corresponding service serving resource according to the policy information, deploying the policy, and sending back a policy deployment report to the policy decision functional entity by the GGSN in the packet-domain mobile communication network.

10. A method for releasing service serving network resource in a service serving system, wherein the method comprises:
- detecting, by a service gateway in the service serving system that comprises a policy decision functional entity (PDF) and a gateway GPRS support node (GGSN) which is connected to the PDF and configured to interact with the PDF to assign and release service serving resource, the end of a service session;
- collecting, by the service gateway, service session resource assignment information and generating a service resource release authorization request; and
- sending, by the service gateway, the service resource release authorization request to a policy decision functional entity, and the policy decision functional entity completes the service resource release by interacting with a packet-domain mobile communication network.

11. The method for releasing a service serving network resource according to claim 10, wherein the policy decision functional entity completing the service resource release by interacting with a packet-domain mobile communication network, which further comprises:
- sending, by the service gateway, the service resource release authorization request to the policy decision functional entity;
- delivering a policy deployment request to the packet-domain mobile communication network by the policy decision functional entity according to the service resource release authorization request;
- releasing the corresponding service serving resource, cancelling the corresponding policy, and sending back a policy deployment report to the policy decision functional entity by the packet-domain mobile communication network according to the policy deployment request; and
- receiving the policy deployment report and sending back a resource release authorization response by the policy decision functional entity.

12. The method for releasing service serving network resource according to claim 11, comprising:
- delivering a policy deployment request to the GGSN in the packet-domain mobile communication network; and
- releasing corresponding service serving resource, cancelling corresponding policy, and sending back a policy deployment report to the policy decision functional entity by the packet-domain mobile communication network, according to the policy deployment request, which further comprises:
- releasing corresponding service serving resource, cancelling corresponding policy, and sending back a policy deployment report to the policy decision functional entity by the GGSN, according to the policy deployment request.

13. The method for implementing QoS negotiation according to claim 7, wherein the triggering a resource application authorization request according to the QoS information further comprises:
- sending, by the service gateway, a resource application authorization request to a policy decision functional entity according to the service QoS information;
- delivering policy information to a packet-domain mobile communication network by the policy decision functional entity according to the resource application authorization request;
- assigning corresponding service serving resource according to the policy information, deploying the policy information, and sending back a policy deployment report to the policy decision functional entity by the packet-domain mobile communication network; and
- sending back a resource application authorization response by the policy decision functional entity.

* * * * *

UNITED STATES PATENT AND TRADEMARK OFFICE
CERTIFICATE OF CORRECTION

| | | |
|---|---|---|
| PATENT NO. | : 7,852,848 B2 | Page 1 of 1 |
| APPLICATION NO. | : 12/199561 | |
| DATED | : December 14, 2010 | |
| INVENTOR(S) | : Yin | |

It is certified that error appears in the above-identified patent and that said Letters Patent is hereby corrected as shown below:

Column 9, line 66, cancel the word "a".

Signed and Sealed this
Fifteenth Day of February, 2011

David J. Kappos
*Director of the United States Patent and Trademark Office*